US012753843B2

(12) United States Patent
Pendleton et al.

(10) Patent No.: US 12,753,843 B2
(45) Date of Patent: Oct. 6, 2026

(54) DOVETAILED GATE VALVE

(71) Applicant: GARTECH, LLC, Houston, TX (US)

(72) Inventors: Gary Pendleton, Shotley Bridge (GB); Gary Warren Stratulate, Houston, TX (US)

(73) Assignee: Gartech LLC, Houston, TX (US)

( * ) Notice: Subject to any disclaimer, the term of this patent is extended or adjusted under 35 U.S.C. 154(b) by 0 days.

(21) Appl. No.: 18/786,171

(22) Filed: Aug. 14, 2024

(65) Prior Publication Data

US 2025/0035218 A1 Jan. 30, 2025

Related U.S. Application Data

(60) Provisional application No. 63/529,608, filed on Jul. 28, 2023.

(51) Int. Cl.
*F16K 3/18* (2006.01)

(52) U.S. Cl.
CPC .................................... *F16K 3/186* (2013.01)

(58) Field of Classification Search
CPC ............. F16K 3/18; F16K 3/184; F16K 3/186
See application file for complete search history.

(56) References Cited

U.S. PATENT DOCUMENTS 680,714 A * 8/1901 Jefferson ................. F16K 3/186 251/167
737,414 A * 8/1903 Jones ...................... F16K 3/186 251/167
936,454 A * 10/1909 Jefferson ................. F16K 3/186 251/167
2,906,491 A * 9/1959 Young ..................... F16K 3/186 251/328
3,558,097 A 1/1971 DeFrees
3,743,244 A * 7/1973 Dickenson ................ F16K 3/14 251/327
4,165,063 A * 8/1979 Qasim ..................... F16K 3/186 251/168
8,939,432 B1 * 1/2015 Tan ......................... F16K 3/186 251/328

(Continued)

FOREIGN PATENT DOCUMENTS

CN 113639060 A * 11/2021 ........... F16K 27/044
GB 2009370 A * 6/1979 ............. F16K 3/186
NL 7702081 A * 8/1978 ............... F16K 3/18

OTHER PUBLICATIONS

Machine English translation of CN-113639060-A (Year: 2026).*

(Continued)

*Primary Examiner* — Hailey K. Do
(74) *Attorney, Agent, or Firm* — C. Tumey Law Group PLLC

(57) ABSTRACT

A gate valve includes a bonnet mated to a body and a stem extending through the bonnet and into the body. The gate valve also includes a seat positioned within the body and a gate, the gate positioned within the body and adapted to form a fluid seal with the seat. The gate includes two tapered seat wedges, the tapered seat wedges have a tapered side and a flat side and a dovetail gate, the dovetail gate positioned between the two tapered seat wedges, the tapered sides of the tapered seat wedges adjacent the dovetail gate.

13 Claims, 10 Drawing Sheets

(56) References Cited

U.S. PATENT DOCUMENTS

| | | | |
|---|---|---|---|
| 2022/0390029 | A1 | 12/2022 | Pendleton et al. |
| 2022/0390031 | A1 | 12/2022 | Pendleton et al. |

OTHER PUBLICATIONS

Machine English translation of NL-7702081-A (Year: 2026).*

Cleaning Technologies Group, Valves—Manual Valves—Gate and Butterfly Valve, 2023. Available at https://techblog.ctgclean.com/2012/03/valves-manual-valves-gate-and-butterfly-valves/, Accessed Jul. 22, 2024.

* cited by examiner

DOVETAILED GATE VALVE

CROSS-REFERENCE TO RELATED APPLICATIONS

The present application claims priority to U.S. Provisional Application No. 63/529,608, filed Jul. 28, 2023.

FIELD OF THE DISCLOSURE

Aspects of the disclosure relate to valves and valve systems.

BACKGROUND

A gate valve is a valve that opens by lifting a barrier (gate) out of the path of a fluid to open the valve. Gate valves require little space along the pipe axis and provide little restriction to flow of fluid when the gate is fully opened. Gate valves are normally used to shut off flow or allow flow and typically are not used for flow regulation.

SUMMARY

The disclosure includes a gate valve. The gate valve includes a bonnet mated to a body and a stem extending through the bonnet and into the body. The gate valve also includes a seat positioned within the body and a gate, the gate positioned within the body and adapted to form a fluid seal with the seat. The gate includes two tapered seat wedges, the tapered seat wedges have a tapered side and a flat side and a dovetail gate, the dovetail gate positioned between the two tapered seat wedges, the tapered sides of the tapered seat wedges adjacent the dovetail gate.

The disclosure also includes a method. The method includes supplying a gate valve, the gate valve including a gate valve. The gate valve includes a bonnet mated to a body and a stem extending through the bonnet and into the body. The gate valve also includes a seat positioned within the body and a gate, the gate positioned within the body and adapted to form a fluid seal with the seat. The gate includes two tapered seat wedges, the tapered seat wedges have a tapered side and a flat side, and a dovetail gate, the dovetail gate positioned between the two tapered seat wedges, the tapered sides of the tapered seat wedges adjacent the dovetail gate. The method also includes positioning the gate in the raised position, wherein in the raised position, the gate valve allows for fluid flow through the gate valve and the gate is not within the seat.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not to be considered limiting of its scope, for the disclosure may admit to other equally effective embodiments.

Figure 1:
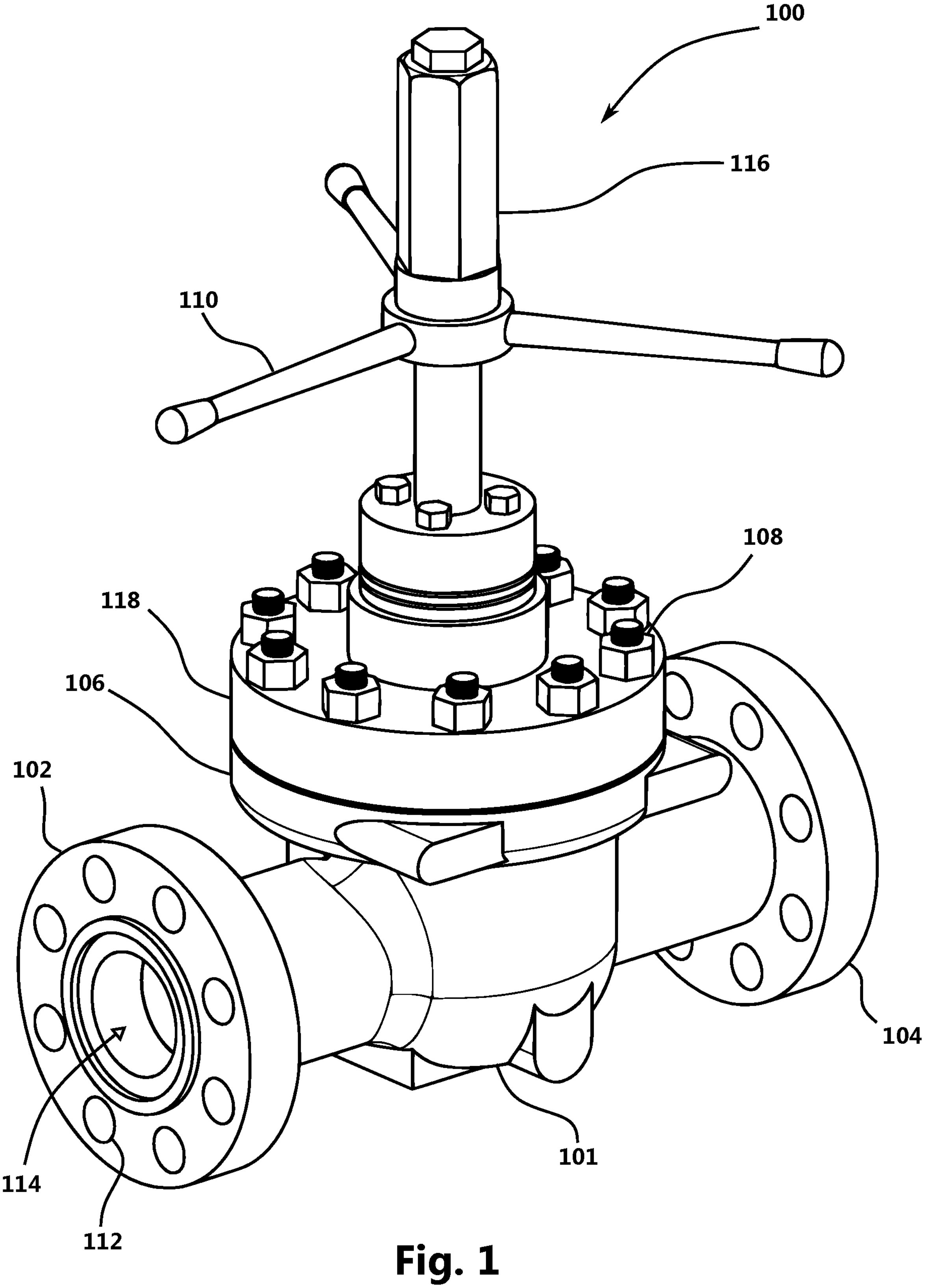
FIG. 1 is a perspective view of a gate valve consistent with certain embodiments of the present disclosure.

To facilitate understanding, identical reference numerals have been used, where possible, to designate identical elements that are common to the figures ("FIGs"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

FIG. 1 depicts an outside perspective view of an embodiment of gate valve 100. Gate valve 100 may include, for example handwheel 110 that is connected to stem 116 to allow for raising and lowering of interior portions of gate valve 100 creating the sealing arrangement, as described below. Rotation of handwheel 110 may move components within gate valve 100 to establish the sealing arrangement. Rotation of handwheel 110 in the opposite direction unseats and opens gate valve 100. Bonnet 118 may mate with lower flange 106 of body 101 and be tightened with bolts 108.

Body 101 forms an enclosed interior space into which portions of gate valve 100, described below, may be moved to allow for fluid flow through fluid pathway 114. In certain embodiments, gate valve 100 may be connected to piping, for example, through flanges 102 and 104. FIG. 2A is a longitudinal view of the exterior of gate valve 100 consistent with certain embodiments of present disclosure.

Figure 2B:
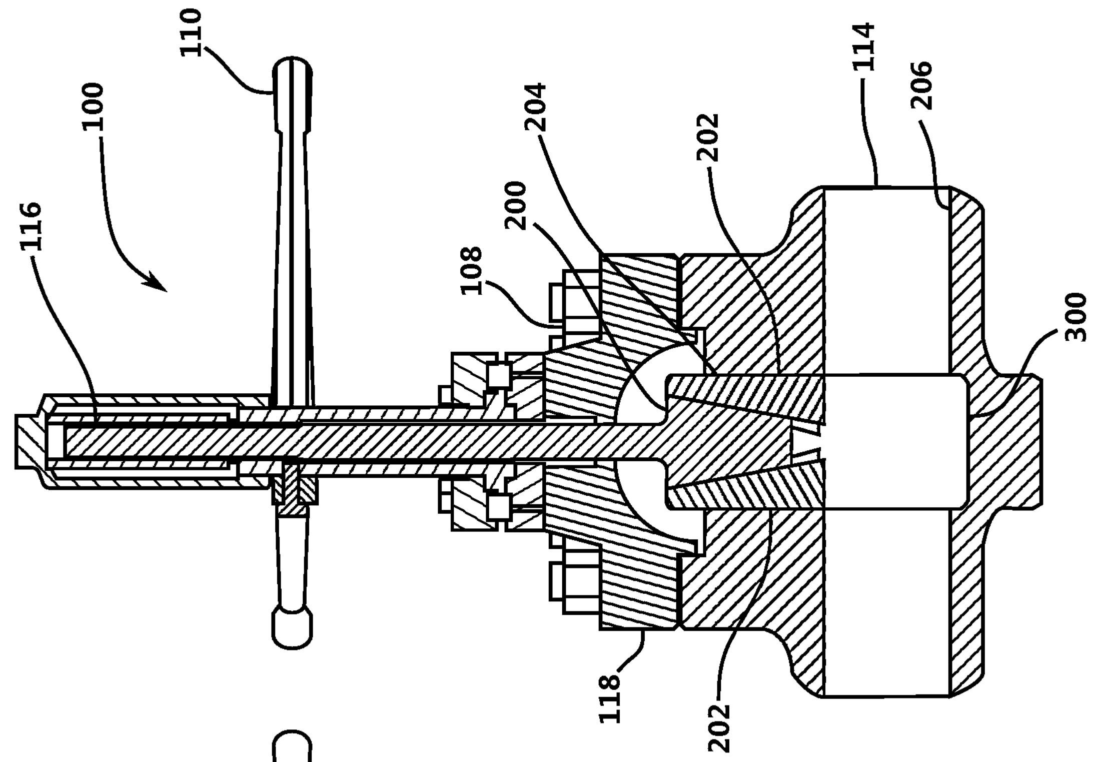
FIG. 2B is a cutaway side view of a gate valve consistent with certain embodiments of the present disclosure.
Figure 2A:
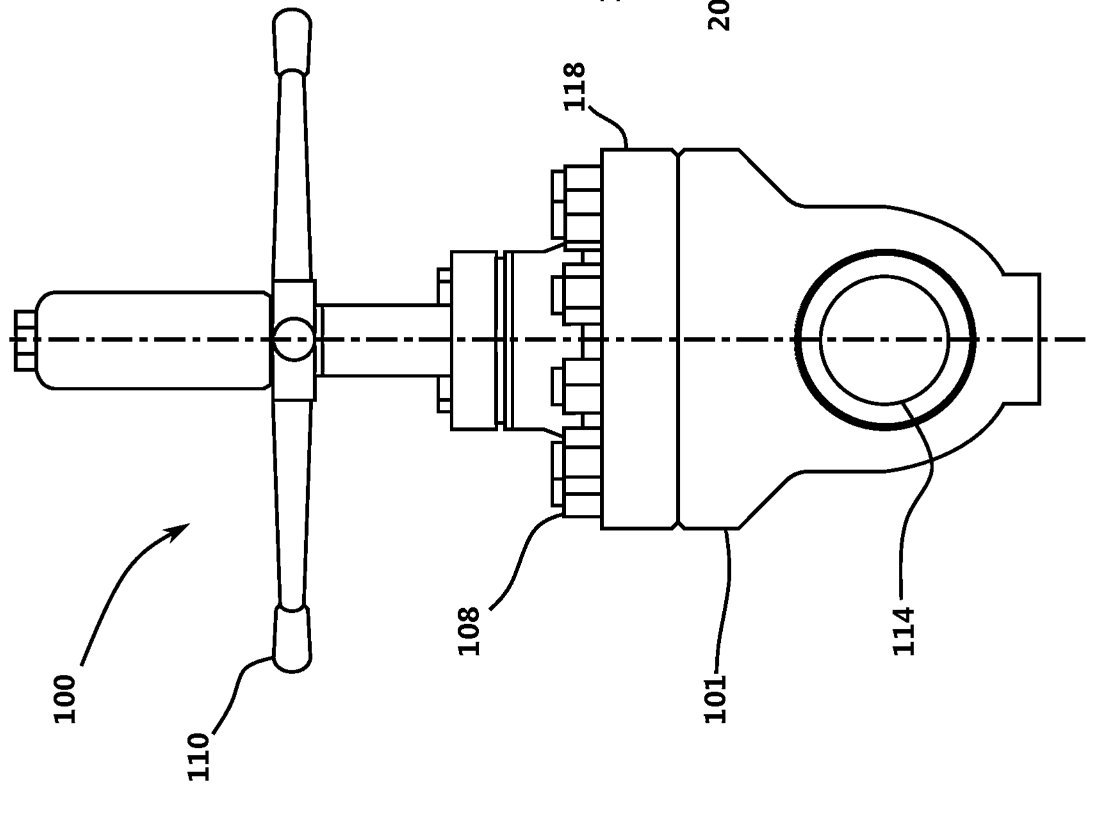
FIG. 2A is a longitudinal view off a gate valve consistent with certain embodiments of the present disclosure

FIG. 2B is a cutaway side view of gate valve 100. FIG. 2B depicts stem 116 in a raised position, where gate 204 is in a raised position, allowing for fluid flow through flow path 206 through gate valve 100. Gate 204 consists, in part as shown in FIG. 2B, of tapered seat wedges 202 separated by dovetail gate 200. Tapered seat wedges 202, as shown in FIGS. 2-6, are positioned outside and slidingly engaged with dovetail gate 200. Tapered edge 205 of each of tapered seat wedges 202 is tapered opposite dovetail tapered edge 220 of dovetail gate 200. In the embodiments shown in FIGS. 2-6, the smallest point of tapered edge 220 is towards bonnet 118. In certain embodiments, as shown in FIGS. 3-6, each of tapered seat wedges 202 includes male dovetail portion 208. Male dovetail portion 208 is adapted to fit within female dovetail portion 224 of dovetail gate 200 shown in FIG. 3A. Male dovetail portion 208 is also adapted to slide along female dovetail portion 224. Stem 116 is connected to dovetail gate 200. In certain embodiments, stem 116 and dovetail gate 200 may be formed integrally to form one solid piece. In addition to tapered edge 205, each tapered set wedge 202 may include flat side 210. Flat side 210 may include rounded corner 212 and bottom 214. Rounded corner 212 may facilitate seating of tapered seat wedges 202 into valve seat 300.

Figure 3:
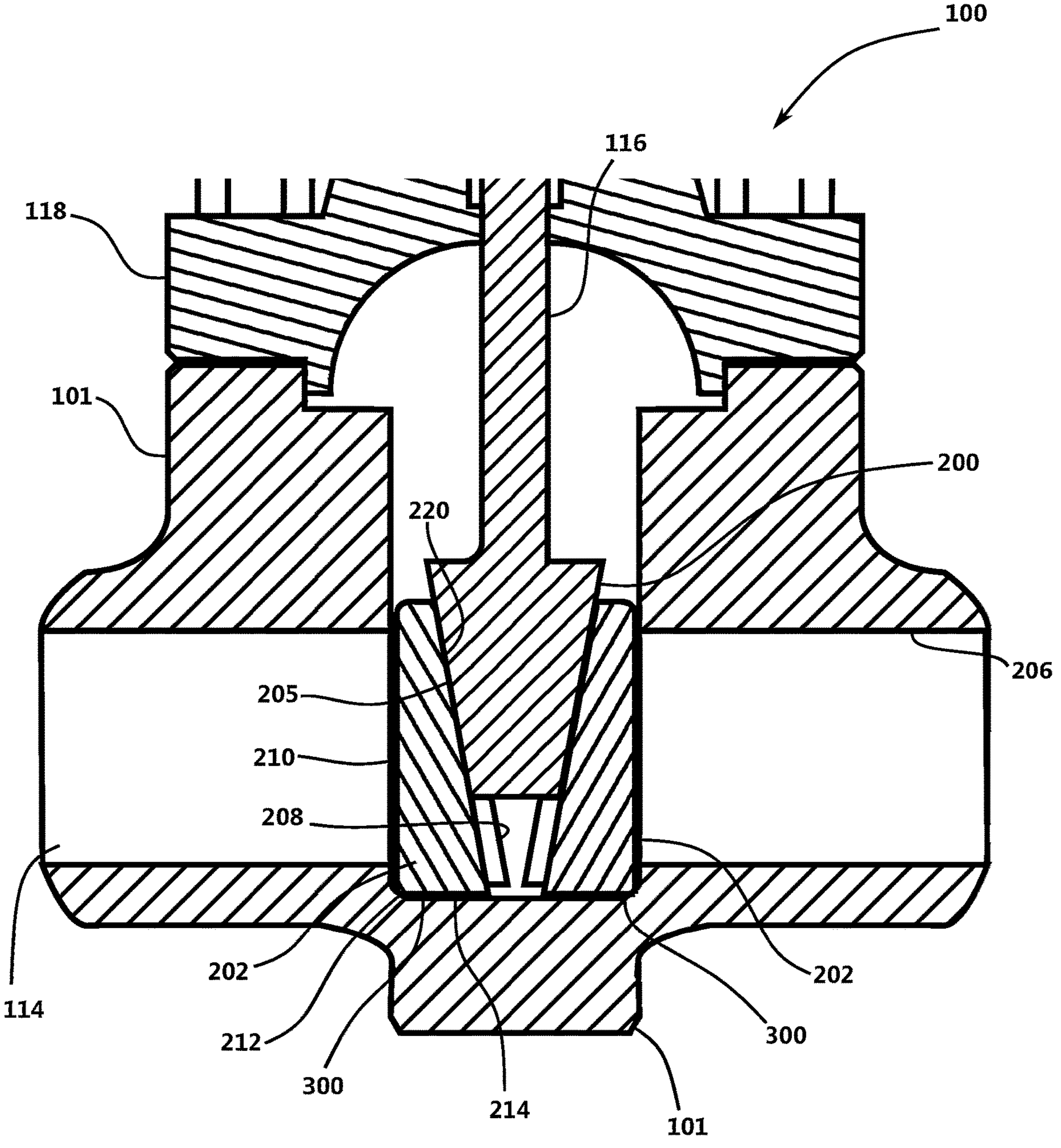
FIG. 3 is an expanded view of a lower valve position of the valve of FIG. 1.
Figure 3A:
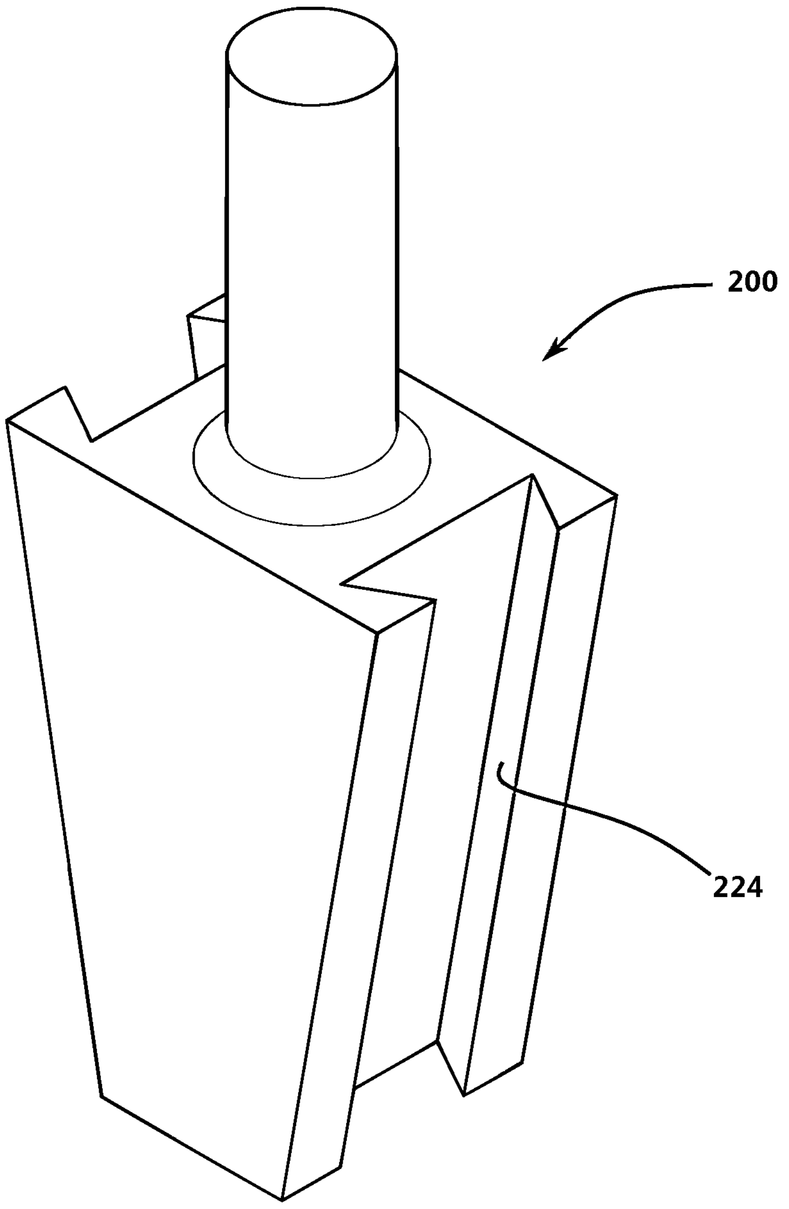
FIG. 3A is an isolated view of a dovetail gate consistent with certain embodiments of the present disclosure
Figure 4:
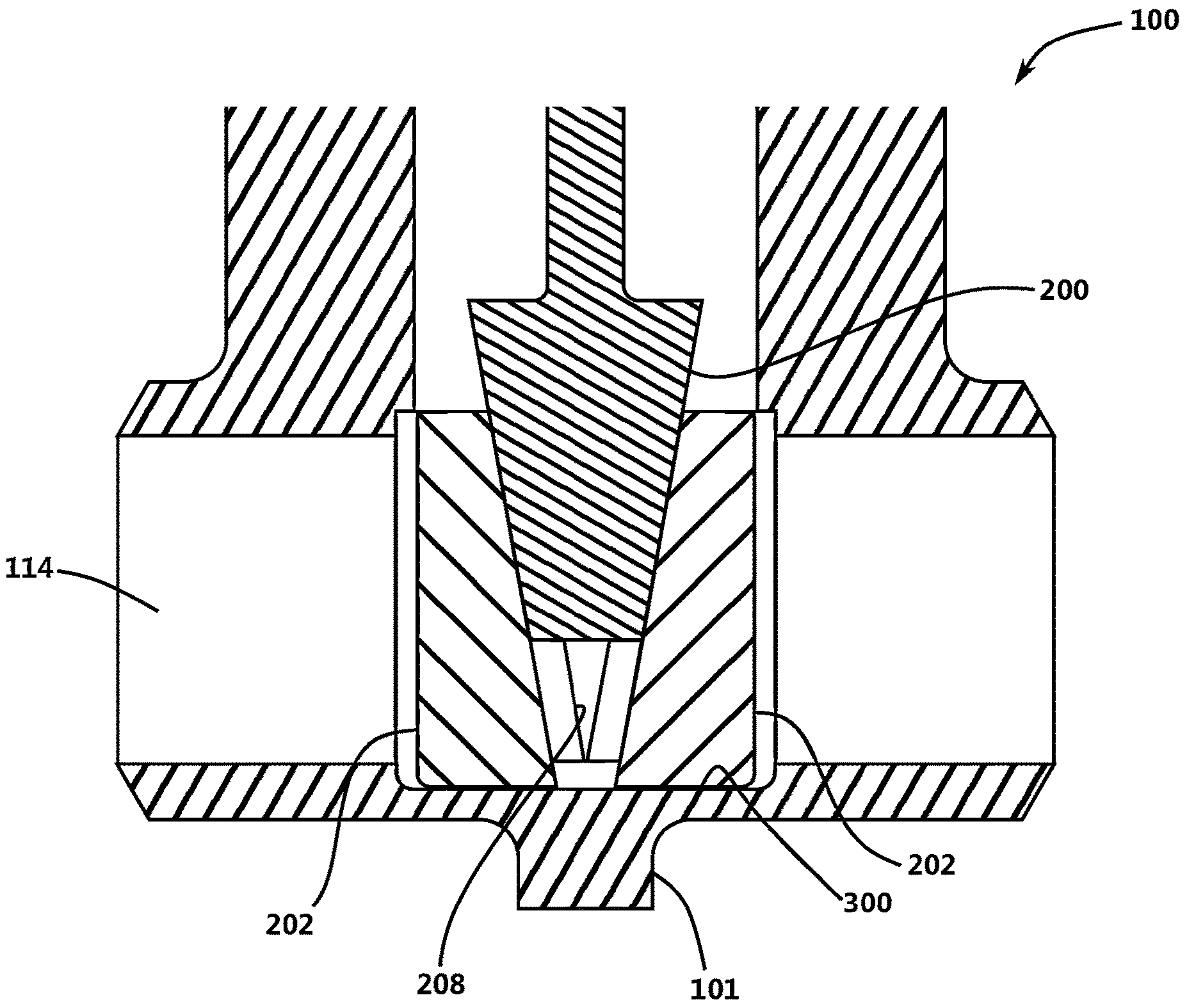
FIG. 4 is an expanded view of the clearance side profile of the lower end of the embodiment of FIG. 1.
Figure 5:
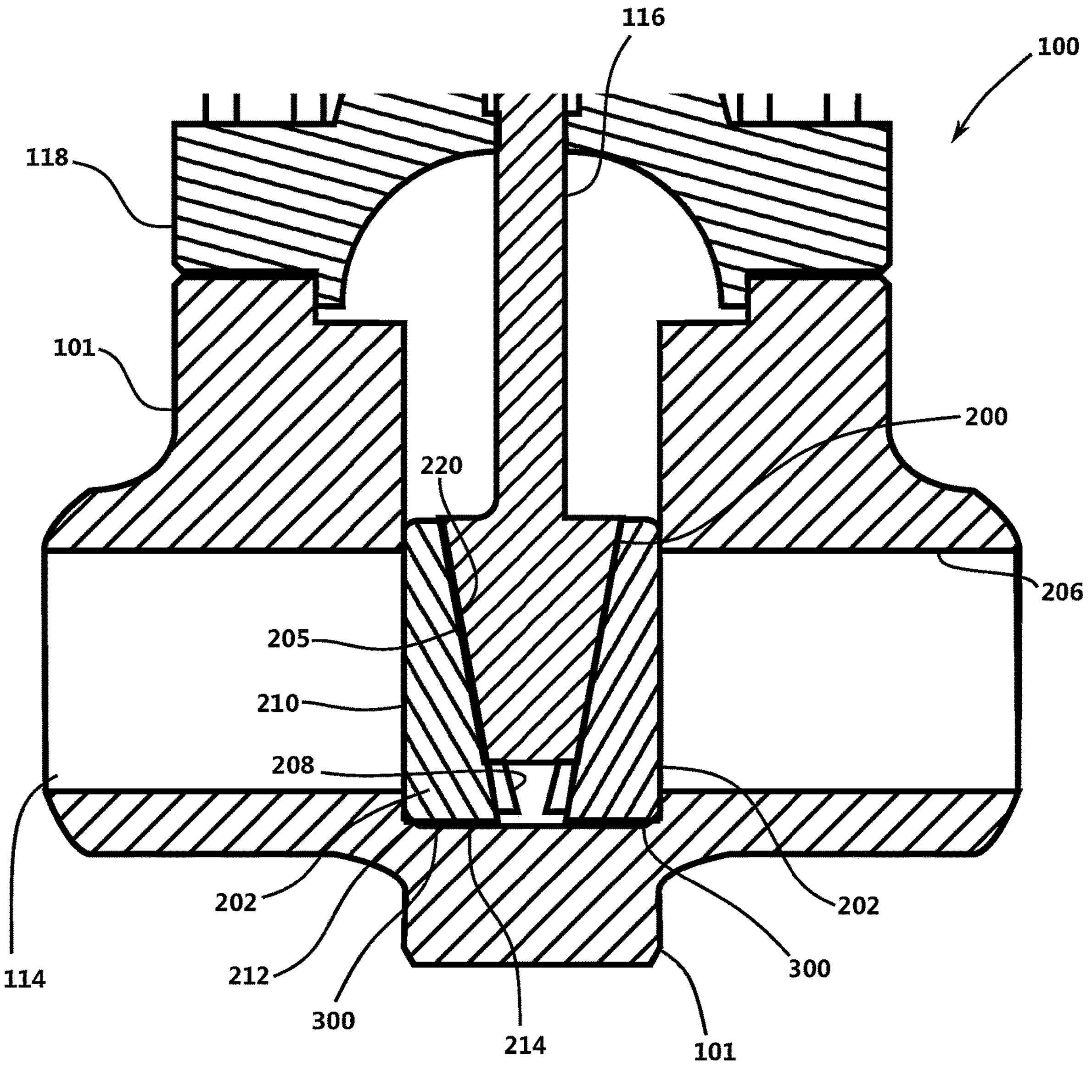
FIG. 5 is a side view of the valve of FIG. 1 with a central gate.
Figure 6:
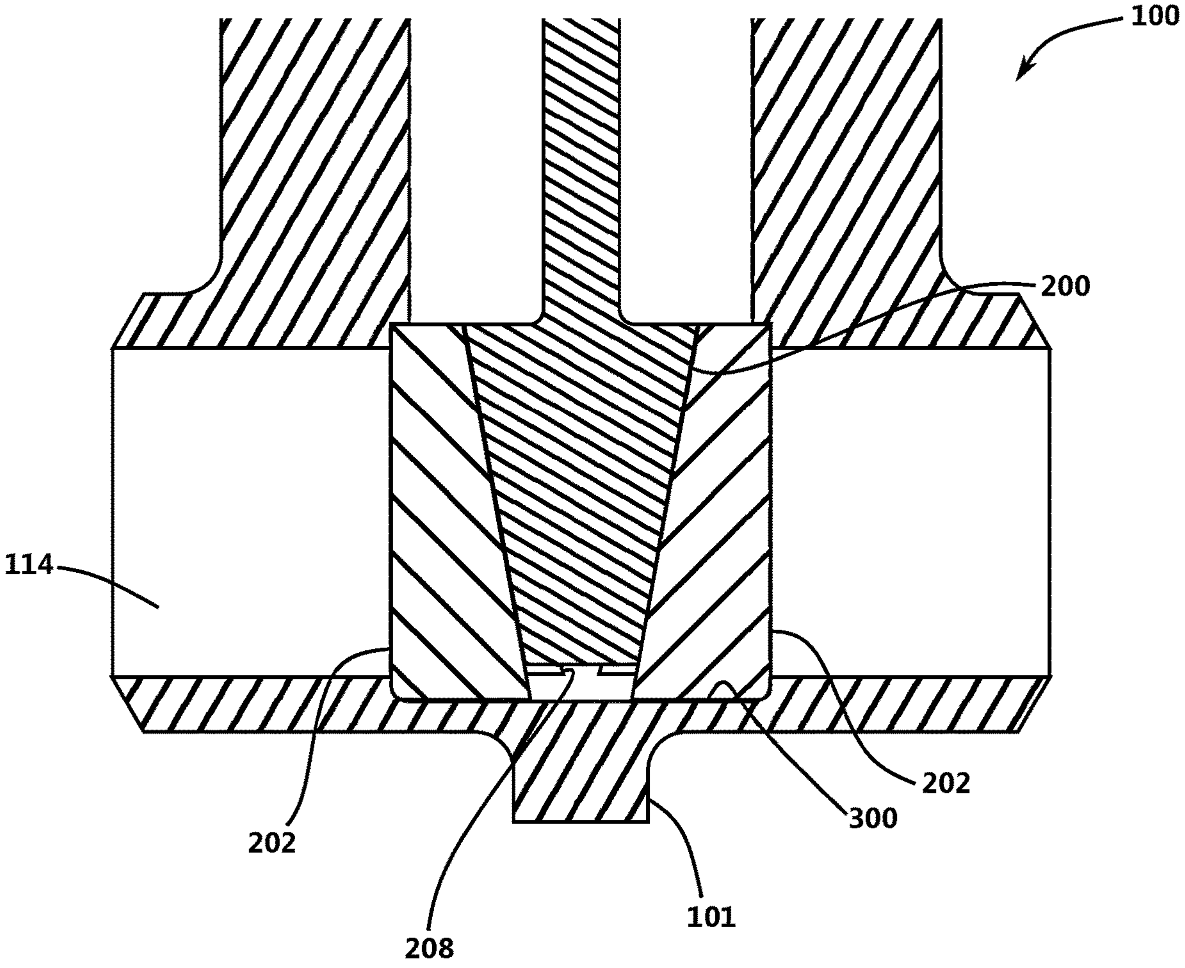
FIG. 6 is an expanded side view of the valve of FIG. 5.

Gate 204 may include three positions: raised, as discussed above with regard to FIG. 2B where tapered seat wedges 202 are not within seat 300; within seat 300, as shown in FIG. 3 and in detail in FIG. 4, where tapered seat wedges 202 are within seat 300 but not extended; and seated, where tapered seat wedges 202 are extended by dovetail gate 200 so as to seat gate 204 within seat 300, as shown in FIG. 5 and in detail in FIG. 6. Thus, in these embodiments, to seat gate 204, stem 116 is lowered by rotation of handwheel 110 from the raised position shown in FIG. 2B to the within seat position shown in FIGS. 3 and 4. In the transition from raised and within seat positions, gate 204 acts as a single unit and tapered seat wedges 202 and dovetail gate 200 do not move relative to each other. Once gate 204 is within seat, continued rotation of handwheel 110 will cause stem 116 to force tapered seat wedges 202 to extend dovetail gate 200 by moving female dovetail portion 224 along male dovetail portions 208. By moving female dovetail portion 224 along male dovetail portions 208, male dovetail portions 208 are forced apart, as shown in FIGS. 5 and 6. As male dovetail portions 208 are forced apart, tapered seat wedges 202 are forced apart and seat fully in the seated position. When gate 204 is in the seated position, fluid flow is prevented/retarded along flow path 206.

Figure 7:
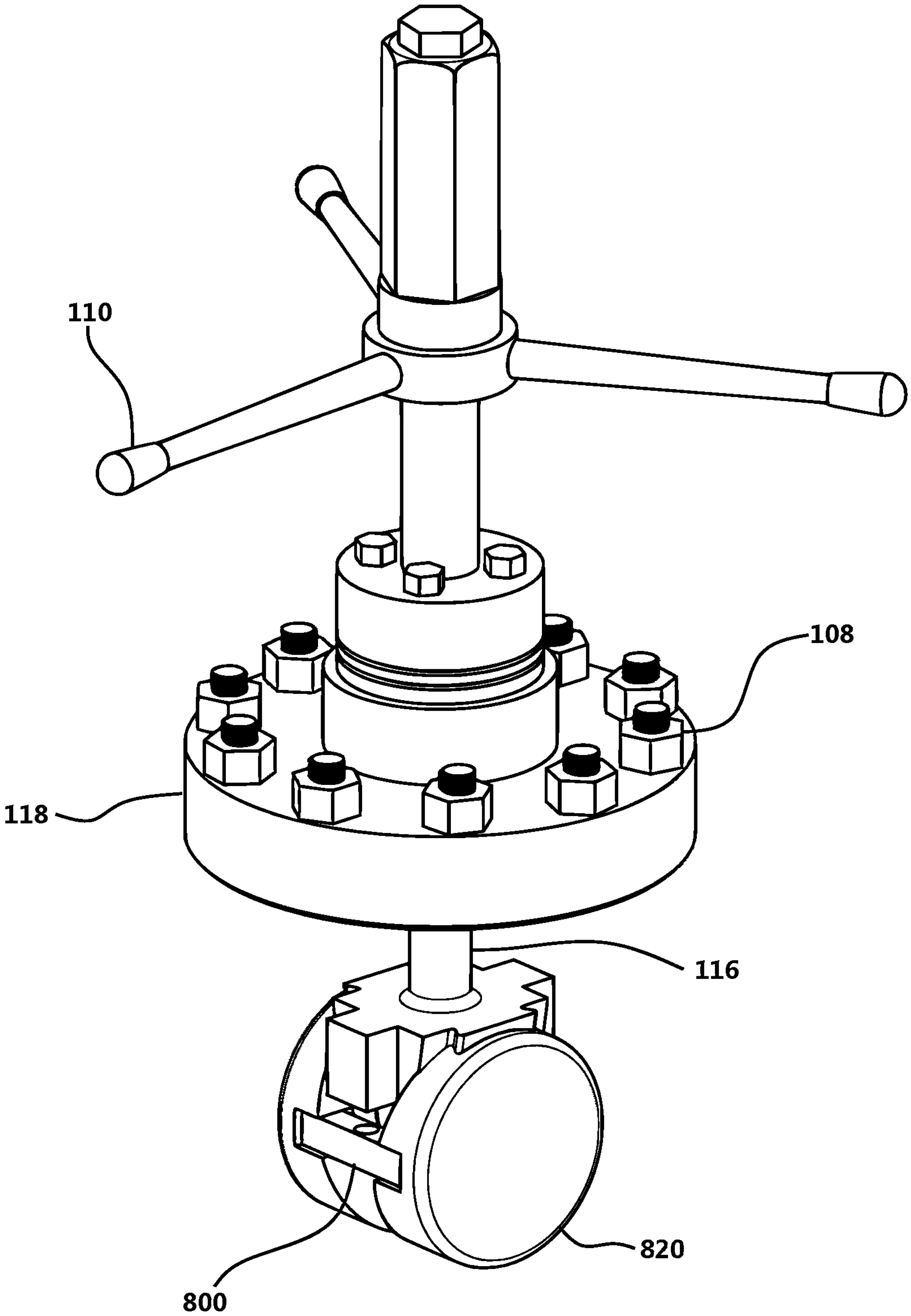
FIG. 7 is a view of the valve of FIG. 1 with a spring preload consistent with certain alternate embodiments of the present disclosure.
Figure 8:
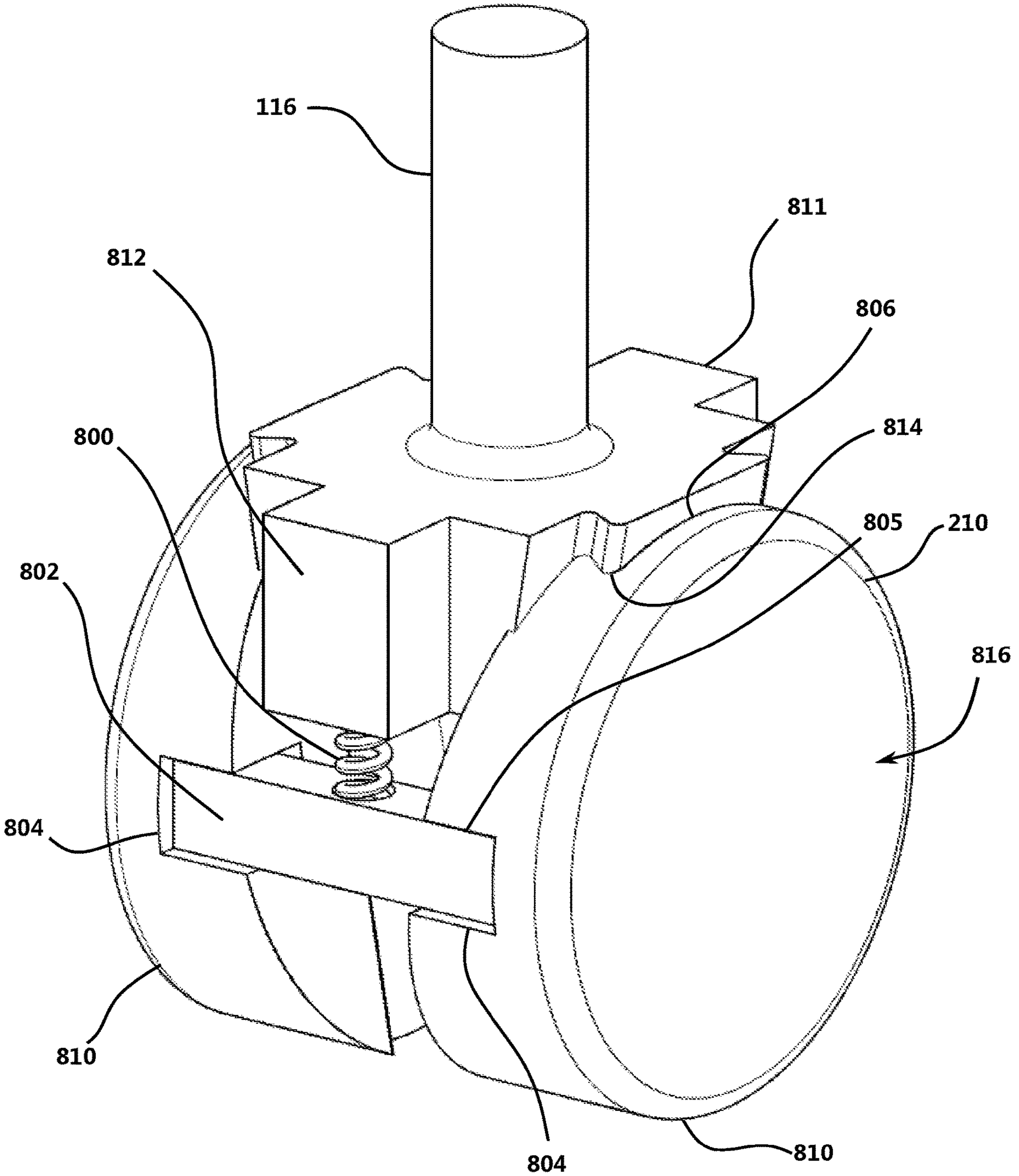
FIG. 8 is a view of the valve of FIG. 7, with an expanded view of the gate consistent with certain embodiments of the present disclosure.
Figure 9:
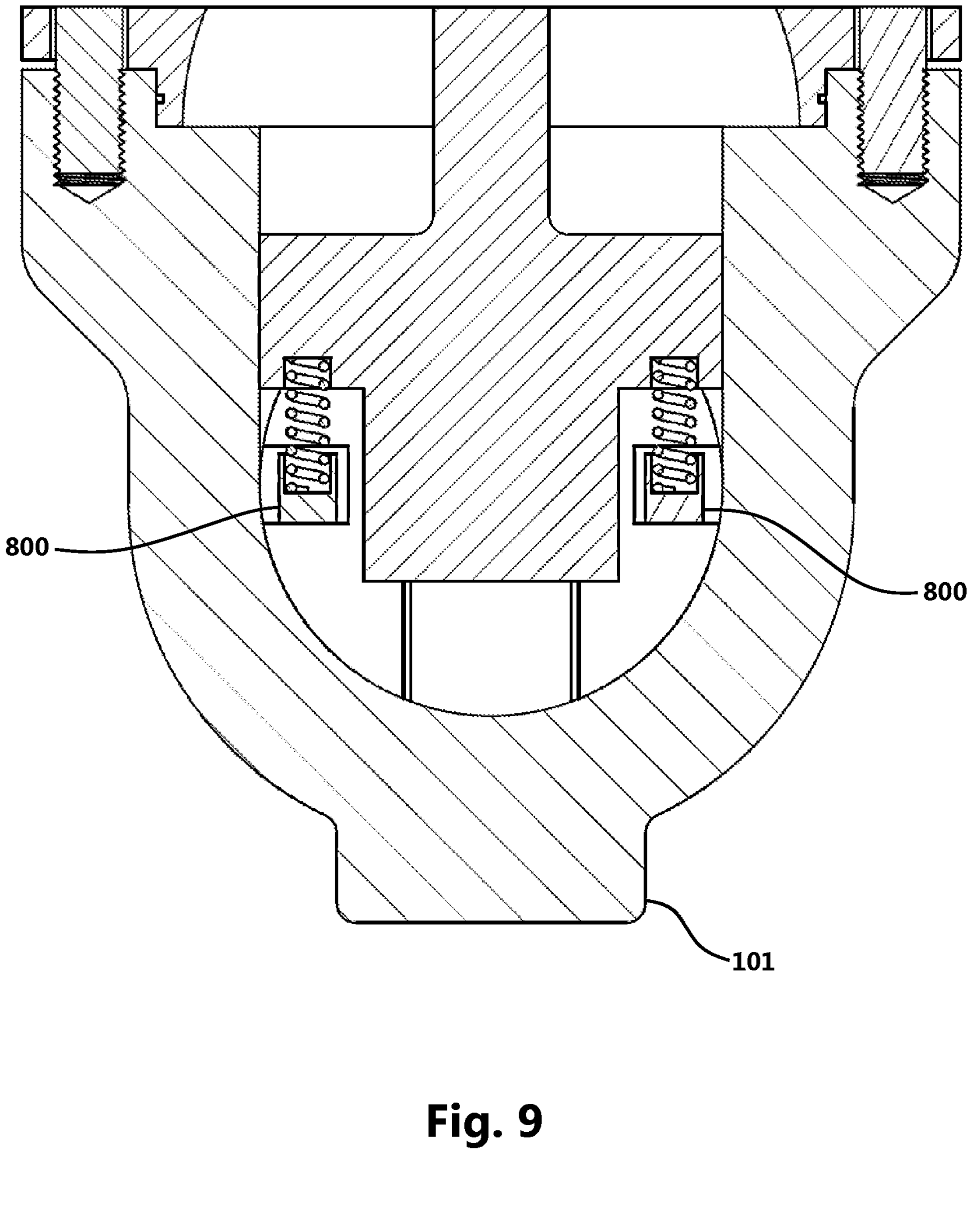
FIG. 9 is a cross-sectional view of spring loaded bottom portion of FIG. 7 consistent with certain embodiments of the present disclosure.

An alternate embodiment is shown in FIGS. 7-9. FIG. 7 depicts stem 116 in a raised position, wherein gate 820 is in a raised position. Gate 820 includes tapered seat wedges 810 positioned outside and slidingly engaged with dovetail gate 811. The alternate embodiment shown in FIGS. 7-9 also includes rectangular blocks 804 and spring 800. Rectangular blocks 804 are positioned partially within tapered seat wedges 810. Rectangular blocks 804 are positioned with long side 805 perpendicular to flat side 210 of tapered seat wedge 810. Further, as shown in FIG. 8, the alternate embodiment includes spring 800. Spring 800 is connected between spring receiver portion 812 of dovetail gate 811 and rectangular block 802.

In the alternate embodiment shown in FIGS. 7-9, dovetail gate 811 includes male dovetail portions 806 that slidingly engage female dovetail portions 814 of tapered seat wedges 810. Gate 820 may include four positions: raised, as discussed above with regard to FIG. 2B where tapered seat wedges 810 are not within the seat; within seat, as described above with respect to FIGS. 3 and 4, where tapered seat wedges 810 are within the seat but not extended; spring compression, where stem 166 continues to move downward and compress springs 800 against rectangular blocks 804, but tapered seat wedges 810 do not move; and seated, where tapered seat wedges 810 are extended by dovetail gate 811 so as to seat gate 816 within the seat, as described above with respect to FIGS. 5 and 6. Thus, in these embodiments, to seat gate 816, stem 116 is lowered by rotation of handwheel 110 from the raised position to the within seat position. In the transition from raised and within seat positions, gate 816 acts as a single unit and tapered seat wedges 810 and dovetail gate 811 do not move relative to each other. Once gate 816 is within seat, continued rotation of handwheel 110 will cause stem 116 to force springs 800 to compress against rectangular blocks 804. Once the spring force associated with springs 800 is overcome by the lowering of stem 116, tapered seat wedges 810 extend dovetail gate 811 by moving male dovetail portion 806 along female dovetail portions 814. By moving male dovetail portion 806 along female dovetail portions 814, female dovetail portions 814 are forced apart. As female dovetail portions 814 are forced apart, tapered seat wedges 810 are forced apart and seat fully in the seated position. When gate 816 is in the seated position, fluid flow is prevented/retarded along flow path 206.

Conversely in the alternate embodiment, when raising stem 116, first tapered seat wedges 810 come together. As stem 116 is further raised, spring 800 elongates and then gate 816 is raised from the seat.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A gate valve comprising:
- a bonnet mated to a body;
- a stem extending through the bonnet and into the body; a seat positioned within the body; and
- a gate, the gate positioned within the body and adapted to form a fluid seal with the seat, the gate comprising:
- two tapered seat wedges, the tapered seat wedges have a tapered side and a flat side; and
- a dovetail gate, the dovetail gate positioned between the two tapered seat wedges, the tapered sides of the tapered seat wedges adjacent the dovetail gate;
- a spring receiver portion positioned on the dovetail gate;
- a plurality of blocks, the plurality of blocks partially positioned within the tapered seat wedges; and
- a spring, the spring connected between the spring receiver portion and the plurality of blocks.

2. The gate valve of claim 1, wherein the stem and the dovetail gate are formed integrally.

3. The gate valve of claim 1, wherein the flat side of the two tapered wedges includes a rounded corner.

4. The gate valve of claim 1, wherein the dovetail gate has a plurality of dovetail tapered edges, wherein the tapered sides each have a tapered edge, and wherein the tapered edges are opposite each other.

5. The gate valve of claim 1 further comprising:
- a male dovetail portion on each of the tapered seat wedges; and
- a female dovetail portion on each side of the dovetail gate, the male dovetail portion and the female dovetail portion slidingly engaged and the male dovetail portion is adapted to fit within the female dovetail portion.

6. The gate valve of claim 1, wherein the plurality of blocks each have a long side, the long side perpendicular to the flat side of the tapered seat wedge.

7. The gate valve of claim 1, wherein the dovetail gate includes male dovetail portions and the tapered seat wedges include female dovetail portions, wherein the male dovetail portions and the female dovetail portions are slidingly engaged.

8. A method comprising:
- supplying a gate valve, the gate valve including:
  - a bonnet mated to a body;
  - a stem extending through the bonnet and into the body; a seat positioned within the body; and
  - a gate, the gate positioned within the body and adapted to form a fluid seal with the seat, the gate comprising:
  - two tapered seat wedges, the tapered seat wedges have a tapered side and a flat side;
  - a dovetail gate, the dovetail gate positioned between the two tapered seat wedges, the tapered sides of the tapered seat wedges adjacent the dovetail gate;
  - a spring receiver portion positioned on the dovetail gate;
  - a plurality of blocks, the plurality of blocks partially positioned within the tapered seat wedges; and
  - a spring, the spring connected between the spring receiver portion and the plurality of blocks; and
- positioning the gate in the raised position, wherein in the raised position, the gate valve allows for fluid flow through the gate valve and the gate is not within the seat.

9. The method of claim 8 further comprising after positioning the gate in the raised position, lowering the gate, by lowering the stem, into the seat such that the tapered seat wedges are within the seat, to reach the within seat position.

10. The method of claim 9 further comprising after lowering the gate, causing the stem to force tapered seat wedges apart by extending the dovetail gate to a seated position.

11. The method of claim 9 further comprising lowering the stem to compress the spring against the plurality of blocks to a spring compression position.

12. The method of claim 11 further comprising causing the stem to force tapered seat wedges apart by extending the dovetail gate to a seated position.

13. A gate valve comprising:
- a bonnet mated to a body;
- a stem extending through the bonnet and into the body; a seat positioned within the body; and
- a gate, the gate positioned within the body and adapted to form a fluid seal with the seat, the gate comprising:
  - two tapered seat wedges, the tapered seat wedges have a tapered side and a flat side;
  - a plurality of blocks, the plurality of blocks partially positioned within the tapered seat wedges; and
  - a spring, which compresses against the plurality of blocks.

* * * * *